FIG.1. : Relationships between $^{14}$C-Mervan plasmatic concentrations and analgesic activity.

3,824,277
4-ALLYLOXY-3-CHLORO-PHENYL-ACETIC ACID
Nguyen Phuc Buu-Hoi, Hue, South Vietnam, and Georges Lambelin and Claude Gillet, Brussels, Belgium, assignors to Madan AG, Chur, Switzerland
Continuation-in-part of application Ser. No. 754,972, Aug. 23, 1968, which is a continuation-in-part of application Ser. No. 695,969, Jan. 5, 1968, both now abandoned. This application May 26, 1970, Ser. No. 40,544
Claims priority, application Belgium, Sept. 27, 1974, 704,368; Aug. 1, 1968, 718,930
Int. Cl. C07c 65/00
U.S. Cl. 260—521 A          1 Claim

ABSTRACT OF THE DISCLOSURE

Acids of the formula

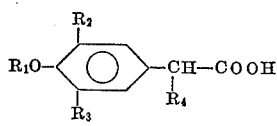

Figure 1:
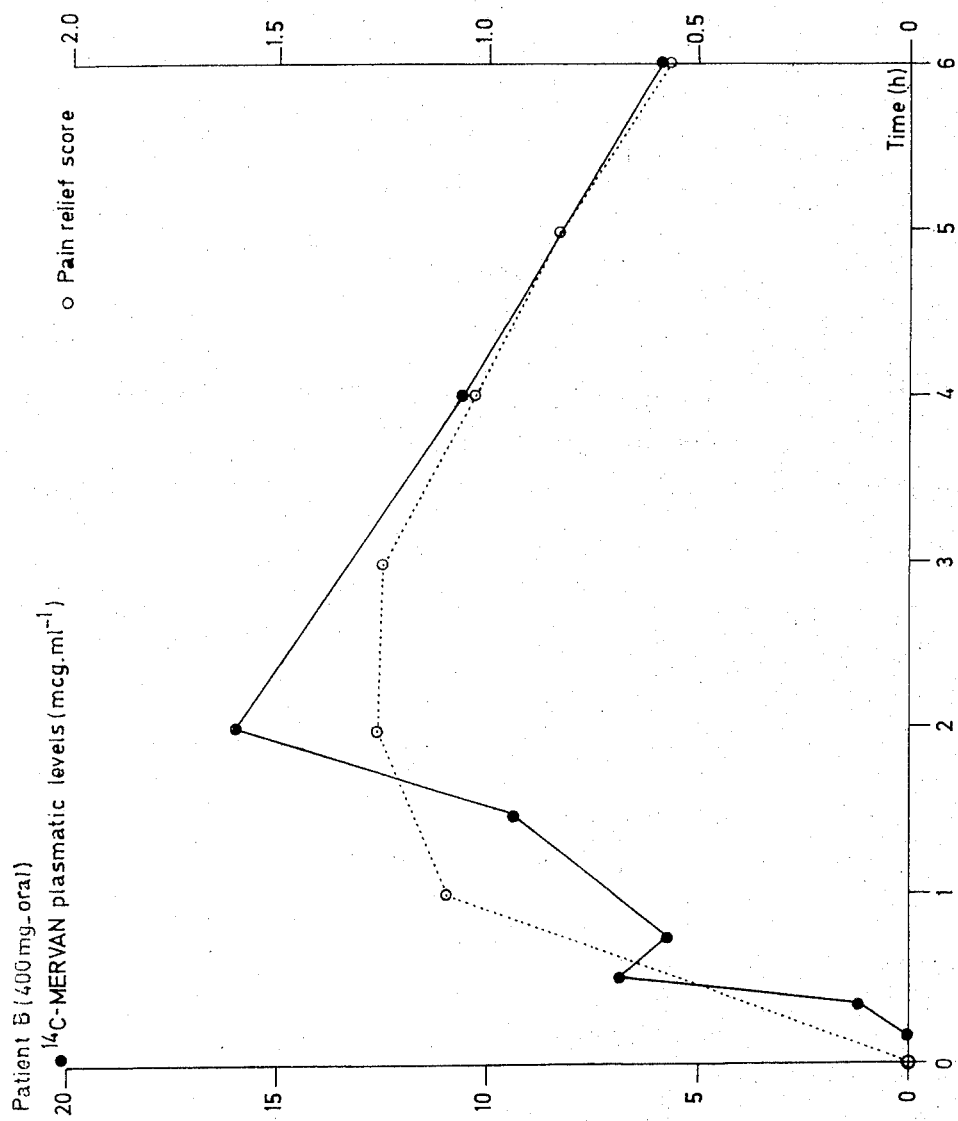

wherein:

$R_1$ represents a linear or branched alkyl radical $C_2$–$C_8$; a linear or branched alkenyl radical $C_2$–$C_4$; an alkynyl radical $C_3$–$C_4$; a cycloalkenyl radical $C_5$–$C_6$; a benzyl radical; or a benzyl radical substituted by an alkyl radical, an alkoxy radical or a halogen;

$R_2$ and $R_3$ each represent a linear or branched alkyl radical $C_1$–$C_3$, a lower alkenyl radical $C_2$–$C_4$, a lower alkoxy radical $C_1$–$C_4$ or a halogen atom, $R_2$ and $R_3$ being identical or different, one of said $R_2$ and $R_3$ may also be hydrogen;

$R_4$ represents hydrogen or a linear or branched lower alkyl radical $C_1$–$C_4$, salts thereof; preparation of the above, and their use as antipyretic, anti-inflammatory, analgesic and antispasmodic agents.

---

This invention is a continuation-in-part application of our copending application No. 754,972, filed Aug. 23, 1968, now abandoned which itself is a continuation-in-part of our application No. 695,969, filed Jan. 5, 1968, now bandoned.

This invention relates to synthesis and applications to pharmaceutical field of p-alkyloxy-, p-alkenyloxy-, p-alkynyloxy-, p-cycloalkenyloxy-, and p-benzyloxyphenylacetic acids and of salts thereof.

Said acids may be represented by the following formula I.

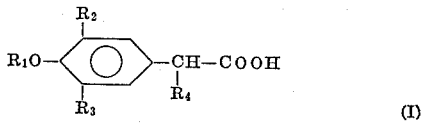

wherein:

$R_1$ represents a linear or branched alkyl radical $C_2$–$C_8$; a linear or branched alkenyl radical $C_2$–$C_4$; an alkynyl radical $C_3$–$C_4$; a cycloalkenyl radical $C_5$–$C_6$; a benzyl radical; or a benzyl radical substituted by an alkyl radical $C_1$–$C_3$, an alkoxy radical $C_1$–$C_8$ or a halogen;

$R_2$ and $R_3$ each represent a linear or branched alkyl radical $C_1$–$C_3$, a lower alkenyl radical $C_2$–$C_4$, a lower alkoxy radical $C_1$–$C_4$ or a halogen atom, $R_2$ and $R_3$ being identical or different, one of said $R_2$ and $R_3$ may also be hydrogen;

$R_4$ represents hydrogen or a linear or branched lower alkyl radical $C_1$–$C_4$.

This invention also relates to salts of alkaline and alkaline-earth metals and to amine salts of said acids.

The inventors have found that said compounds have numerous applications in pharmaceutical field due to their antipyretic, anti-inflammatory, analgesic and antispasmodic activity. The toxicity of said compounds is very low. The following derivatives are some examples of active products having general formula (I).

3-chloro-4-allyloxyphenylacetic acid
3-chloro-4-propargyloxyphenylacetic acid
3-chloro-4-crotyloxyphenylacetic acid
3-chloro-4-isopropyloxyphenylacetic acid
3-chloro-4-metallyloxyphenylacetic acid
3-chloro-4-n-amyloxyphenylacetic acid
3-methoxy-4-allyloxyphenylacetic acid
3-methoxy-4-n-propyloxyphenylacetic acid
3-methoxy-4-metallyloxyphenylacetic acid
3-methoxy-4-crotyloxyphenylacetic acid
3-methoxy-4-propargyloxyphenylacetic acid
3-methyl-4-allyloxyphenylaceic acid
3-methyl-4-propargyloxyphenylacetic acid
3-methyl-4-metallyloxyphenylacetic acid
3-methyl-4-crotyloxyphenylacetic acid
3-methyl-4-n-butyloxyphenylacetic acid
3-bromo-4-allyloxyphenylacetic acid
3-fluoro-4-allyloxyphenylacetic acid
3-bromo-4-propargyloxyphenylacetic acid
3-fluoro-4-propargyloxyphenylacetic acid
3-bromo-4-n-butyloxyphenylacetic acid
3-fluoro-4-crotyloxyphenylacetic acid
3-fluoro-4-n-butyloxyphenylacetic acid
3-ethyl-4-allyloxyphenylacetic acid
3-ethyl-4-n-propyloxyphenylacetic acid
3-isopropyl-4-n-butyloxyphenylacetic acid
3-isopropyl-4-allyloxyphenylacetic acid
3-ethoxy-4-propargyloxyphenylacetic acid
3-ethoxy-4-allyloxyphenylacetic acid
3-ethoxy-4-n-propyloxyphenylacetic acid
3.5-dibromo-4-allyloxyphenylacetic acid
3.5-dichloro-4-allyloxyphenylacetic acid
3.5-dibromo-4-propargyloxyphenylacetic acid
3.5-dimethyl-4-allyloxyphenylacetic acid
3.5-dimethyl-4-n-propyloxyphenylacetic acid
3.5-dimethyl-4-propargyloxyphenylacetic acid
3.5-dichloro-4-propargyloxyphenylacetic acid
3.5-dichloro-4-n-propyloxyphenylacetic acid
3-chloro-5-methyl-4-allyloxyphenylacetic acid
3-chloro-5-methyl-4-n-propyloxyphenylacetic acid
3-chloro-5-methoxy-4-allyloxyphenylacetic acid
4-isobutyloxy-3.5-dichlorophenylacetic acid
4-n-butyloxy-3.5-dichlorophenylacetic acid
4-sec butyloxy-3.5-dichlorophenylacetic acid
4-amyloxy-3.5-dichlorophenylacetic acid
4-isoamyloxy-3,5-dichlorophenylacetic acid
3.5-dichloro-4-iso propyloxyphenylacetic acid
α (3-chloro-4-allyloxyphenyl)propionic acid
α (3-bromo-4-allyloxyphenyl)propionic acid
α (3-bromo-4-propargyloxyphenyl)propionic acid
α (3-fluoro-4-allyloxyphenyl)propionic acid
α (3-chloro-4-n-propyloxyphenyl)propionic acid
α (3-chloro-4-propargyloxyphenyl)propionic acid
α (4-allyloxy-3.5-dichlorophenyl)propionic acid
α (3.5-dichloro-4-propargyloxyphenyl)propionic acid
α (3.5-dichloro-4-propyloxyphenyl)propionic acid
α (4-isobutyloxy-3.5-dichlorophenyl)propionic acid
α (3-chloro-4-isopropyloxyphenyl)propionic acid
α (4-allyloxy-3-fluorophenyl)propionic acid
α (3-fluoro-4-isopropyloxyphenyl)propionic acid
α (3-fluoro-4-propargyloxyphenyl)propionic acid
α (4-allyloxy-3-chlorophenyl)butyric acid
α (3-chloro-4-propargyloxyphenyl)butyric acid 3-bromo-5-chloro-4-allyloxyphenylacetic acid
3-methoxy-5-bromo-4-allyloxyphenylacetic acid
3-bromo-5-methyl-4-allyloxyphenylacetic acid
3-bromo-5-methyl-4-propargyloxyphenylacetic acid
3-bromo-5-methyl-4-crotyloxyphenylacetic acid
3-chloro-4-(Δ2-cyclohexenyloxy)phenylacetic acid
3-chloro-4-(Δ2-cyclopentenyloxy)phenylacetic acid
3-methyl-4-(Δ2-cyclohexenyloxy)phenylacetic acid
3-methoxy-4-(Δ2-cyclohexenyloxy)phenylacetic acid.

Examples of salts of acids of formula I which are useful according to the invention are:

Sodium 3-chloro-4-allyloxyphenylacetate
Magnesium 3-chloro-4-allyloxyphenylacetate
Ethanolamine 3-chloro-4-allyloxyphenylacetate
Ethanolamine 3-fluoro-4-propargyloxyphenylacetate
Ethanolamine 3-fluoro-4-allyloxyphenylacetate
Butylamine 3-chloro-4-allyloxyphenylacetate.

The general process for preparing acids of formula I comprises hydrolysing a compound of formula II:

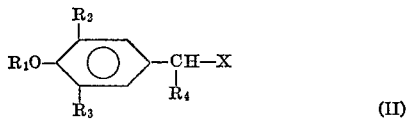

wherein $R_1$, $R_2$, $R_3$ and $R_4$ have the meaning given hereinbefore and X represents the nitrile function —CN or the ester function —COOR$_5$ in which $R_5$ represents a lower alkyl radical.

When X represents the nitrile function —CN in formula II, hydrolysis is carried out in acid or basic medium so as to obtain the acid involved.

When X represents the ester function —COOR$_5$ in formula II, said ester is obtained by starting from an ester of a substituted p-hydroxyphenylacetic acid of the formula III

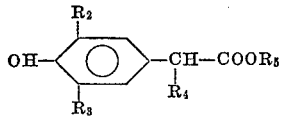

wherein $R_2$, $R_3$, $R_4$ and $R_5$ have the meaning given hereinabove, this ester being alkylated in position para with an alkyl, alkenyl, alkynyl or cycloalkenyl halide, then the ester so obtained is hydrolysed in order to obtain the acid desired.

Several examples of preparation of substituted acids and salts thereof according to the invention are given hereinafter, said examples being not intended to restrict the scope of the invention.

EXAMPLE 1

3-chloro-4-crotyloxyphenylacetic acid 100 g. of methyl 3-chloro-4-hydroxyphenylacetate (0.5 mol), 67.5 g. of crotyl bromide (0.5 mol), 69 g. of anhydrous potassium carbonate and 150 cc. of acetone are refluxed for 6 hours with vigorous stirring. After cooling, the mixture is diluted with water and extracted with ether. The ethereal phase is washed with water, carbonate and water, dried on magnesium sulfate and evaporated. The distillation of the residue gives 91.4 g. of methyl 3-chloro-4-crotyloxyphenylacetate. Boiling point: 160°–164° C./2 mm.; $n_D^{25}$: 1.5300; yield: 72%.

50.8 g. of methyl 3-chloro-4-crotyloxyphenylacetate (0.2 mol), 22 g. of potassium hydroxide, 50 cc. of water and 150 cc. of methanol are refluxed for 2 hours. The methanol is evaporated, the residue is diluted with water and ice and acidified with 20% HCl. The solid is filtered, washed with petroleum ether and dried. The crude product, 39.8 g. (83%), is recrystallised from a mixture of benzene/petroleum ether. Melting point: 82°–83° C. (benzene-petroleum ether).

Analysis.—Calculated (percent): C, 59.88; H, 5.44. Found (percent): C, 59.75; H, 5.26.

EXAMPLE 2

3-methoxy-4-allyloxyphenylacetic acid 10 g. of methyl 3-methoxy-4-hydroxyphenylacetate (0.051 mol), 7 g. of anhydrous potassium carbonate, 6.2 g. of allyl bromide and 20 cc. of acetone are refluxed for 6 hours with vigorous stirring. The mixture is diluted with water, extracted with ether, the ethereal phase is washed with water, carbonate and water, then dried on sodium sulfate and evaporated. The residue rectified under vacuum gives 9.4 g. of methyl 3-methoxy-4-allyloxyphenylacetate having a boiling point of 160°–161° C./2.5 mm.; $n_D^{25}$: 1.5264; yield: 78%.

4.7 g. of methyl 3-methoxy-4-allyloxyphenylacetate, 62 g. of potassium hydroxide, 20 cc. of methanol and 5 cc. of water are refluxed for 2 hours. Maximum alcohol is evaporated, the residue is diluted with water and ice, the product is acidified with 20% HCl and the solid is filtered. 3.3 g. of 3-methoxy-4-allyloxyphenylacetic acid are obtained with a melting point of 81–82° C. (petroleum ether-benzene); yield: 77%.

Analysis.—Calculated (percent): C, 64.85; H, 6.35. Found (percent): C, 64.62; H, 6.24.

EXAMPLE 3

3-methyl-4-allyloxyphenylacetic acid 45 g. of methyl 3-methyl-4-hydroxyphenylacetate (0.25 mol), 34.5 g. of potassium carbonate, 30.5 g. of allyl bromide and 100 cc. of acetone are refluxed for 6 hours with vigorous stirring. The mixture is diluted with water and extracted with ether. The ethereal phase is washed with water, bicarbonate and water, then dried on magnesium sulfate, the solvent is evaporated and the residue is rectified under vacuum. 43 g. of methyl 3-methyl-4-allyloxyphenylacetate are obtained. Boiling point: 138°–140° C./1.5 mm.; $n_D^{25}$: 1.5157; yield: 78.2%.

11 g. of methyl 3-methyl-4-allyloxyphenylacetate (0.05 mol); 2.8 g. of potassium hydroxide, 2.5 cc. of water and 25 cc. of methanol are refluxed for 2 hours. Maximum alcohol is evaporated, the residue is diluted with water and ice, then acidified with 20% HCl and the solid is filtered. 10.5 g. of a crude product are obtained, which after having been twice recrystallised from a mixture of benzene and petroleum ether gives 6.5 g. of 3-methyl-4-allyloxyphenylacetic acid. Yield: 63.1%; melting point: 65°–67° C. (petroleum ether-benzene).

Analysis.—Calculated (percent): C, 69.88; H, 6.84. Found (percent): C, 69.68; H, 6.85.

EXAMPLE 4

3-chloro-4-allyloxyphenylacetic acid 23 g. of ethyl 3-chloro-4-hydroxyphenylacetate, 16.2 g. of potassium carbonate, 14.5 g. of allyl bromide and 50 cc. of anhydrous acetate are refluxed for 6 hours with stirring.

The mixture is cooled, diluted with water and extracted with ether. The ethereal phase is washed with 10% carbonate and water, dried on magnesium sulfate and evaporated. The residue rectified under vacuum gives 22.6 g. of ester. Yield: 81.6%; boiling point: 120–122° C./0.2 mm.; $n_D^{25}$: 1.5331.

22 g. of methyl 4-allyloxy-3-chlorophenylacetate and 50 cc. of 20% sodium hydroxide are refluxed for 1 hour. The solution is cooled and washed with ether, then acidified with 20% HCl and the precipitate is washed with water. A recrystallisation from cyclohexane gives 16.1 g. of product. Yield: 78%; melting point: 91–92° C.

Analysis.—Calculated (percent): C, 58.29; H, 4.89; Cl, 15.64. Found (percent): C, 58.32; H, 4.71; Cl, 15.51.

EXAMPLE 5

3-fluoro-4-propargyloxyphenylacetic acid 40 g. of methyl 3-fluoro-4-hydroxyphenylacetate, 31 g. of anhydrous potassium carbonate, 26.5 g. of propargyl bromide and 100 cc. of anhydrous acetone are mixed. The mixture is refluxed for 6 hours with stirring. The mixture is cooled, diluted with water and extracted with ether. The ethereal phase is washed with 10% carbonate, then with water, dried on magnesium sulfate and evaporated. The residue rectified under vacuum gives 43.9 g. of ester. Yield: 94%; B.P.: 140–142° C. (1 mm.); $n_D^{25}$: 1.5130.

22.2 g. of methyl 3-fluoro-4-propargyloxyphenylacetate (0.1 mol), 10 g. of potassium hydroxide, 20 cc. of water and 100 cc. of methanol are refluxed for 2 hours. The alcohol is distilled out and the residue is diluted with water. The aqueous phase is washed with ether and acidified with 20% hydrochloric acid. The precipitate is filtered, washed with water and recrystallised from a mixture of cyclohexane-benzene. M.P.: 93–95° C.

*Analysis.*—Calculated (percent): C, 63.46; H, 4.36. Found (percent): C, 63.52; H, 4.18.

EXAMPLE 6

4-crotyloxy-3-ethoxyphenylacetic acid 47 g. of methyl 3-ethoxy-4-hydroxyphenylacetate, 31 g. of anhydrous potassium carbonate, 33 g. of crotyl bromide and 100 cc. of anhydrous acetone are refluxed with stirring for 6 hours. The mixture is cooled, diluted with water and extracted with ether. The ethereal phase is washed with 10% carbonate, then with water, dried on magnesium sulfate and evaporated. The residue rectified under vacuum gives 44 g. of ester. Yield: 74%; B.P.: 140–144° C. (1 mm.); $n_D^{25}$: 1.5210.

15 g. of methyl 4-crotyloxy-3-ethoxyphenylacetate, 10 g. of sodium hydroxide, 20 cc. of water and 100 cc. of methanol are refluxed for 2 hours. The alcohol is distilled out and the residue is diluted with water. The aqueous phase is washed with ether, then acidified with 20% hydrochloric acid. The precipitate is filtered, washed with water and recrystallised from cyclohexane. M.P.: 75–77° C.; yield 73%.

*Analysis.*—Calculated (percent): C, 67.18; H, 7.25. Found (percent): C, 67.21; H, 717.

EXAMPLE 7

4-crotyloxy-3-methylphenylacetic acid 17 g. of methyl 4-hydroxy-3-methylphenylacetate, 13.2 g. of anhydrous potassium carbonate, 12.9 g. of crotyl bromide and 50 cc. of acetone are refluxed with stirring for 6 hours. The mixture is cooled, diluted with water and extracted with ether. The ethereal phase is washed with 10% carbonate, then with water, dried on magnesium sulfate and evaporated. The residue rectified under vacuum gives 19.4 g. of ester. Yield: 87.4%; B.P.: 137–139° C./1 mm.; $n_D^{25}$: 1.5386.

9.5 g. of this ester and 50 cc. of a 20% aqueous sodium hydroxide solution are stirred at room temperature for 2 hours. The mixture is washed with ether and acidified with 20% HCl. The precipitate is filtered, washed with water and recrystallised from petroleum ether; M.P.: 86–87.5° C.

*Analysis.*—Calculated (percent): C, 70.88; H, 7.32. Found (percent): C, 70.52; H, 7.28.

EXAMPLE 8

3-bromo-5-methyl-4-propargyloxyphenylacetic acid 52 g. of methyl 3-bromo-4-hydroxy-5-methylphenylacetate, 27.2 g. of potassium carbonate, 24 g. of propargyl bromide and 60 cc. of acetone are refluxed for 6 hours with stirring. After cooling, the mixture is diluted with water and extracted with ether. The ethereal phase is washed with 10% carbonate, then with water, dried on magnesium sulfate and evaporated. The residue rectified under vacuum gives 48.5 g. of ester. Yield: 81%; B.P.: 150° C./0.8 mm.. $n_D^{25}$: 1.5452.

25 g. of methyl 3-bromo-5-methyl-4-propargyloxyphenylacetate, 6 g. of KOH, 10 cc. of water and 100 cc. of methanol are refluxed for 4 hours. The mixture is cooled and washed with ether. The aqueous phase is acidified with 20% HCl. The precipitate is filtered, washed with water and recrystallized from ether-petroleum ether. There is obtained 13.5 g. of product having a melting point of 151–153° C.; yield 60%.

*Analysis.*—Calculated (percent): C, 50.90; H, 3.91. Found (percent): C, 50.89; H, 3.92.

EXAMPLE 9

4-allyloxy-3,5-dichlorophenylacetic acid 56 g. of methyl 3.5-dichloro-4-hydroxyphenylacetate, 32 g. of anhydrous potassium carbonate, 20 cc. of allyl bromide and 100 cc. of anhydrous acetone are refluxed for 6 hours with stirring. After cooling, the mixture is diluted with water and extracted with ether. The ethereal phase is washed with 10% carbonate, then with water, dried and evaporated. The residue rectified under vacuum gives 43.5 g. of ester; yield: 70%; B.P.: 146–148° C./ 1 mm.; $n_D^{25}$: 1.538.

20 g. of methyl 4-allyloxy-3.5-dichlorophenylacetate and 50 cc. of 20% sodium hydroxide are stirred for 2 hours at room temperature. The solution is washed with ether and acidified with 20% HCl. The precipitate is filtered, washed with water and recrystallised from cyclohexane. There are obtained 15.1 g. of product. Yield: 82%; M.P.: 118–119° C.

*Analysis.*—Calculated (percent): C, 50.60; H, 3.86. Found (percent): C, 50.76; H, 3.80.

EXAMPLE 10

3-ethyl-4-propargyloxyphenylacetic acid 43 g. of methyl 3-ethyl-4-hydroxyphenylacetate, 30.5 g. of anhydrous potassium carbonate, 29 g. of propargyl bromide and 60 cc. of acetone are refluxed for 6 hours with stirring. After cooling, the mixture is diluted with water and extracted with ether. The ethereal phase is washed with 10% carbonate, then with water, dried on magnesium sulfate and evaporated. The residue rectified under vacuum gives 38.6 g. of ester; yield: 75.9%; B.P.: 124–127° C./0.5 mm.; $n_D^{25}$: 1.5238.

38 g. of methyl 3-ethyl-4-propargyloxyphenylacetate and 100 cc. of 20% sodium hydroxide are stirred for 2 hours at room temperature. The mixture is washed with ether and acidified with 20% HCl. The precipitate is filtered, washed with water, dried and recrystallised from cyclohexane. There are obtained 22.3 g. of acid; yield: 60%; M.P.: 81.5–83° C.

*Analysis.*—Calculated (percent): C, 71.54; H, 6.47. Found (percent): C, 71.48; H, 6.38.

EXAMPLE 11

4-allyloxy-2-chloro-5-methoxyphenylacetic acid 74 g. of methyl 3-chloro-4-hydroxy-5-methoxyphenylacetate, 44 g. of anhydrous potassium carbonate, 46 g. of allyl bromide and 120 cc. of acetone are refluxed for 6 hours with stirring. After cooling, the mixture is diluted with water and extracted with ether. The ethereal phase is washed with 10% carbonate, then with water, dried on magnesium sulfate and evaporated. The residue rectified under vacuum gives 43 g. of ester. Yield: 50%; B.P.: 157–162° C./3 mm.; $n_D^{25}$: 1.5291.

21 g. of this ester and 100 cc. of a 20% aqueous sodium hydroxide solution are stirred for 2 hours at room temperature. The mixture is washed with ether and acidified with 20% HCl. The precipitate is filtered, washed with water and recrystallised from benzene-petroleum ether. There are obtained 15 g. of acid. Yield: 72%; M.P.: 123.5–125.5° C.

*Analysis.*—Calculated (percent): C, 56.15; H, 5.10. Found (percent): C, 56.05; H, 5.21.

EXAMPLE 12

4-allyloxy-3.5-dimethylphenylacetic acid 46.8 g. of methyl 3.5-dimethyl-4-hydroxyphenylacetate, 27 g. of anhydrous potassium carbonate, 25 g. of allyl bromide and 100 cc. of dry acetone are refluxed with stirring. After cooling, the mixture is diluted with water and extracted with ether. The ethereal phase is washed with 10% carbonate, then with water, dried on magnesium sulfate and evaporated. The residue rectified under vacuum gives 32 g. of ester. Yield: 70%; B.P.: 146° C./2 mm.; $n_D^{25}$: 1.50.

16 g. of this ester and 50 cc. of a 20% aqueous sodium hydroxide solution are stirred for 2 hours at room temperature. The mixture is washed with eter, acidified with 20% HCl, the precipitate is filtered and recrystallised from aqueous methanol. There are obtained 9.9 g. of acid. Yield: 70%; M.P.: 88–99° C.

*Analysis.*—Calculated (percent): C, 70.89; H, 7.32. Found (percent): C, 71.07. H, 7.30.

EXAMPLE 13

α-(4-allyloxy-3-chlorophenyl)propionic acid 21.4 g. of methyl α-(3 - chloro-4-hydroxyphenyl)propionate, 13.8 g. of anhydrous potassium carbonate, 12.5 g. of allyl bromide and 50 cc. of acetone are refluxed for 6 hours with stirring. The mixture is cooled, diluted with water and extracted with ether. The ethereal phase is washed with 10% carbonate, then with water, dried on magnesium sulfate and evaporated. The residue rectified under vacuum gives 19.4 g. (76%) of ester; B.P.: 170–173° C./3 mm.; $n_D^{25}$: 1.5297.

10 g. of this ester and 50 cc. of a 20% aqueous sodium hydroxide solution are stirred for 2 hours at room temperature. The mixture is washed with ether and acidified with 20% HCl, then the precipitate is filtered and washed with water. One recrystallises from ether-petroleum ether;

ANALYSIS

M.P.: 38–41° C.
Calculated (percent): C, 59.88; H, 5.44.
Found (percent): C, 59.76; H, 5.32.

In the same way, the following acids were prepared.

3-methoxy-4-proparglyoxyphenylacetic acid

M.P.: 108.5°–109° C. (benzene-petroleum ether):
Calculated (percent): C, 65.44; H, 5.49.
Found (percent): C, 65.16; H, 5.42.

3-methoxy-4-n-propyloxyphenylacetic acid

M.P.: 72–74° C. (cyclohexane):
Calculated (percent): C, 64.27; H, 7.19.
Found (percent): C, 64.18; H, 7.30.

4-allyloxy-3-ethoxyphenylacetic acid

M.P.: 59–60.5° C. (cyclohexane):
Calculated (percent): C, 66.09; H, 6.82.
Found (percent): C, 66.28; H, 6.69.

3-ethoxy-4-propargyloxyphenylacetic acid

M.P.: 96–98° C. (benzene-petroleum ether):
Calculated (percent): C, 66.05; H, 6.02.
Found (percent): C, 66.25; H, 5.99.

3-ethoxy-4-n-propyloxyphenylacetic acid

M.P.: 72–73° C. (cyclohexane):
Calculated (percent): C, 65.53; H, 7.61.
Found (percent): C, 65.23; H, 7.45.

4-allyloxy-3-bromo-5-methylphenylacetic acid

M.P.: 118–119° C. (methanol-water):
Calculated (percent): C, 50.54; H, 4.60.
Found (percent): C, 50.53; H, 4.61.

3-bromo-4-metallyloxy-5-methylphenylacetic acid

M.P.: 109–110° C. (cyclohexane):
Calculated (percent): C, 52.19; H, 5.05.
Found (percent): C, 51.96; H, 5.01.

4-allyloxy-3-chloro-5-methylphenylacetic acid

M.P.: 111.5–112.5° C. (methanol-water):
Calculated (percent): 59.88; H, 5.44.
Found (percent): C, 59.60; H, 5.38.

3.5-dichloro-4-propargyloxyphenylacetic acid

M.P.: 156–159° C. (ethanol-water):
Calculated (percent): C, 50.99; H, 3.11.
Found (percent): C, 51.02; H, 3.07.

3.5-dichloro-4-n-propyloxyphenylacetic acid

M.P.: 89–91° C. (petroleum ether):
Calculated (percent): C, 50.21; H, 4.60.
Found (percent): C, 50.27; H, 4.57.

4-allyloxy-3.5-dimethylphenylacetic acid

M.P.: 88–89° C. (methanol-water):
Calculated (percent): C, 70.89; H, 7.32.
Found (percent): C, 71.07; H, 7.30.

3.5-dimethyl-4-propargyloxyphenylacetic acid

M.P.: 122–123° C. (methanol-water):
Calculated (percent): C, 71.54; H, 6.47.
Found (percent): C, 71.48; H, 6.36.

3.5-dimethyl-4-n-propyloxyphenylacetic acid

M.P.: 66.5–68° C. (ethanol-water):
Calculated (percent): C, 70.24; H, 8.16.
Found (percent): C, 70.32; H, 8.08.

4-crotyloxy-3.5-dimethylphenylacetic acid

M.P.: 83–84.5° C. (ethanol-water):
Calculated (percent): C, 71.77; H, 7.74.
Found (percent): C, 71.85; H, 7.73.

3-bromo-4-n-butyloxyphenylacetic acid

M.P.: 84–86° C. (methanol-water):
Calculated (percent): C, 50.19; H, 5.26.
Found (percent): C, 50.02; H, 5.15.

4-n-butyloxy-3-isopropylphenylacetic acid

M.P.: 129–131° C. (methanol-water):
Calculated (percent): C, 71.97; H, 8.86.
Found (percent): C, 71.96; H, 8.68.

4-allyloxy-3-isopropylphenylacetic acid

M.P.: 51–53° C. (acetic acid-water):
Calculated (percent): C, 71.77; H, 7.74.
Found (percent): C, 71.80; H, 7.68.

4-allyloxy-3-ethylphenylacetic acid

M.P.: 81–83° C. (petroleum ether):
Calculated (percent): C, 59.39; H, 6.23.
Found (percent): C, 59.48; H, 6.27.

The following compounds were also prepared according to the present invention:

3-bromo-5-chloro-4-propargyloxyphenylacetic acid

M.P.: 161–162° C. (cyclohexane):
Calculated (percent): C, 43.53; H, 2.66.
Found (percent): C, 43.68; H, 2.64.

α-(3-chloro-4-propargyloxyphenyl) propionic acid

M.P.: 103–105° C. (benzene-petroleum ether):
Calculated (percent): C, 60.39; H, 4.64; Cl, 14.85.
Found (percent): C, 60.52; H, 4.60; Cl, 14.90.

3-chloro-4-(p-chlorobenzyloxy)phenylacetic acid

M.P.: 124–125° C. (benzene-cyclohexane):
Calculated (percent): C, 57.90; H, 3.89.
Found (percent): C, 57.85; H, 3.80.

3-chloro-4-(3'-4'-dichlorobenzyloxy) phenylacetic acid

M.P.: 154–155° C. (benzene-cyclohexane):
Calculated (percent): C, 52.13; H, 3.21.
Found (percent): C, 52.15; H, 3.15.

4-sec butyloxy-3,5-dichlorophenylacetic acid

M.P.: 70–71° C. (pentane):
Calculated (percent): C, 52.00; H, 5.10.
Found (percent): C, 52.25; H, 5.15.

4-n butyloxy-3,5-dichlorophenylacetic acid

M.P.: 76–77° C. (hexane-acetone):
Calculated (percent): C, 52.00; H, 5.10.
Found (percent): C, 51.80; H, 5.05.

3-chloro-4-(p-methylbenzyloxy) phenylacetic acid

M.P.: 127–128° C. (benzene-cyclohexane):
Calculated (percent): C, 66.09; H, 5.20.
Found (percent): C, 66.05; H, 5.10.

3-chloro-4-(2',4'-dichlorobenzyloxy) phenylacetic acid

M.P.: 175.5–176° C. (benzene-cyclohexane):
Calculated, (percent): C, 52.13; H, 3.21.
Found (percent): C, 52.05; H, 3.00.

4-isoamyloxy-3-ethylphenylacetic acid

M.P.: 38–39° C. (methanol-water):
Calculated (percent): C, 71.96; H, 8.85.
Found (percent): C, 71.95; H, 8.75.

3-ethyl-4-n octyloxyphenylacetic acid

M.P.: 37–38° C. (methanol-water):
Calculated (percent): C, 73.93; H, 9.65.
Found (percent): C, 73.78; H, 9.45.

4-iso butyloxy-3,5-dichlorophenylacetic acid

M.P.: 99–100° C. (hexane):
Calculated (percent): C, 52.00; H, 5.10.
Found (percent): C, 51.85; H, 4.90.

3-chloro-4-(p-n butyloxybenzyloxy) phenylacetic acid

M.P.: 110–111° C. (chloroform-light petroleum):
Calculated (percent): C, 65.41; H, 6.06.
Found (percent): C, 65.35; H, 6.05.

3,5-dichloro-4-iso propyloxyphenylacetic acid

M.P.: 85–87° C. (cyclohexane):
Calculated (percent): C, 50.10; H, 4.45.
Found (percent): C, 50.20; H, 4.59.

3-iso propyloxy-4-propargyloxyphenylacetic acid

M.P.: 67–69° C. (cyclohexane):
Calculated (percent): C, 72.39; H, 6.94.
Found (percent): C, 72.39; H, 6.87.

3-chloro-5-methyl-4-propyloxyphenylacetic acid

M.P.: 81–83° C. (light petroleum):
Calculated (percent): C, 59.39; H, 6.23.
Found (percent): C, 59.60; H, 6.18.

3-fluoro-4-iso propyloxyphenylacetic acid

M.P.: 80.5–81.5° C. (cyclohexane):
Calculated (percent): C, 62.26; H, 6.17.
Found (percent): C, 62.13; H, 6.19.

4-allyloxy-3,5-dibromophenylacetic acid

M.P.: 106–106.5° C. (cyclohexane):
Calculated (percent): C, 37.75; H, 2.88.
Found (percent): C, 37.85; H, 2.83.

3-chloro-4-propyloxyphenylacetic acid

M.P.: 62–63° C. (cyclohexane):
Calculated (percent): C, 57.77; H, 5.73.
Found (percent): C, 57.68; H, 5.65.

3-chloro-4-(Δ2-cyclohexenyloxy) phenylacetic acid

M.P.: 105–106° C. (benzene-light petroleum):
Calculated (percent): C, 63.04; H, 5.67; Cl, 13.29.
Found (percent): C, 62.96; H, 5.50; Cl, 13.37.

4-sec butyloxy-3-chlorophenylacetic acid

M.P.: 72–73° C. (hexane):
Calculated (percent): C, 59.39; H, 6.23.
Found (percent): C, 59.28; H, 6.28.

3-bromo-4-propargyloxyphenylacetic acid

M.P.: 104–105° C. (cyclohexane):
Calculated (percent): C, 49.10; H, 3.37.
Found (percent): C, 48.96; H, 3.29.

4-allyloxy-3-bromo-5-chlorophenylacetic acid

M.P.: 120–121° C. (cyclohexane-benzene):
Calculated (percent): C, 43.24; H, 3.30.
Found (percent): C, 43.41; H, 3.26.

4-allyloxy-3-chloro-5-iodophenylacetic acid

M.P.: 109–110° C. (cyclohexane):
Calculated (percent): C, 37.47; H, 2.86.
Found (percent): C, 37.49; H, 2.77.

4-iso butyloxy-3-chlorophenylacetic acid

M.P.: 79.5–81° C. (light petroleum):
Calculated (percent): C, 59.39; H, 6.23.
Found (percent): C, 59.20; H, 6.20.

4-benzyloxy-3-chlorophenylacetic acid

M.P.: 120–121° C. (ether-light petroleum):
Calculated (percent): C, 65.11; H, 4.74.
Found (percent): C, 65.10; H, 4.60.

3-chloro-4-n octyloxyphenylacetic acid

M.P.: 58–58.5° C. (benzene):
Calculated (percent): C, 64.30; H, 7.60.
Found (percent): C, 64.40; H, 7.85.

3-chloro-4-n heptyloxyphenylacetic acid

M.P.: 70–72° C. (hexane):
Calculated (percent): C, 63.25; H, 7.40.
Found (percent): C, 63.40; H, 7.40.

3-chloro-4n hexyloxyphenylacetic acid

M.P.: 52–53° C. (acetone-pentane):
Calculated (percent): C, 62.10; H, 7.20.
Found (percent) C, 62.10; H, 7.15.

4-iso amyloxy-3-chlorophenylacetic acid

M.P.: 80–81° C. (hexane):
Calculated (percent): C, 60.82; H, 6.67.
Found (percent): C, 60.83; H, 6.74.

3-chloro-4-(p-fluorobenzyloxy) phenylacetic acid

M.P.: 132–133° C. (light petroleum-benzene):
Calculated (percent): C, 61.10; H, 4.10.
Found (percent): C, 60.97; H, 4.10.

3,5-dichloro-4-n hexyloxyphenylactic acid

M.P.: 58–58.5° C. (pentane):
Calculated (percent): C, 55.10; H, 5.95.
Found (percent): C, 54.92; H, 5.85.

4-iso amyloxy-3,5-dichlorophenylacetic acid

M.P.: 92.5–93° C. (hexane):
Calculated (percent): C, 53.60; H, 5.55.
Found (percent): C, 53.40; H, 5.60.

3-chloro-4-(4'-n butyloxy-3'-chlorobenzyloxy) phenylacetic acid

M.P.: 133.5–135° C. (benzene):
Calculated (percent): C, 59.54; H, 5.26.
Found (percent): C, 59.20; H, 5.20.

4-n amyloxy-3,5-dichlorophenylacetic acid

M.P.: 81–81.5° C. (pentane):
  Calculated (percent): C, 53.60; H, 5.55.
  Found (percent): C, 53.30; H, 5.45.

3,5-dichloro-4-n heptyloxyphenylacetic acid

M.P.: 59–59.5° C. (pentane):
  Calculated (percent) C, 56.45; H, 6.30.
  Found (percent) C, 56.60; H, 6.20.

3,5-dichloro-4-n octylphenylacetic acid

M.P.: 52–53° C. (pentane):
  Calculated (percent): C, 57.65; H, 6.65.
  Found (percent): C, 57.55; H, 6.70.

3-chloro-4-(3'-chloro-4'-methoxybenzyloxy) phenylacetic acid

M.P.: 145–146° C. (benzene):
  Calculated (percent): C, 56.32; H, 4.14.
  Found (percent): C, 56.45; H, 4.20.

The following examples illustrate the preparation of acids from a substituted nitrile.

EXAMPLE 14

4-allyloxy-3-chlorophenylacetic acid 103.7 g. of 3-chloro-4-allyloxyphenylacetonitrile in 500 cc. of ethanol, 100 g. of potassium hydroxide and 100 cc. of water are refluxed for 4 hours. Maximum of alcohol is evaporated, the residue is diluted with water and ice, and acidified with 20% HCl. The solid is filtered and washed with petroleum ether. 91.5 g. of acid are obtained (yield: 81%) which is recrystallised from aqueous methanol; melting point: 92°–93° C.
  *Analysis.*—Calculated (percent): C, 58.29; H, 4.89; Cl, 15.64. Found (percent): C, 58.42; H, 4.93; Cl, 15.55.

EXAMPLE 15

4-allyloxy-3-fluorophenylacetic acid 95 g. of 4-allyloxy-3-fluorophenylacetonitrile (0.5 mol) in 500 cc. of ethanol, 100 g. of potassium hydroxide and 100 cc. of water are refluxed for 4 hours. Maximum of alcohol is evaporated, then one dilutes with water and ice, and the aqueous phase is washed with ether. One acidifies with 20% HCl and the solid is filtered, washed with water and then with petroleum ether. There are obtained 87.2 g. (yield: 83%) of acid which is recrystallised from cyclohexane. M.P.: 77–78.5° C.
  *Analysis.*—Calculated (percent): C, 62.85; H, 5.27. Found (percent): C, 62.86; H, 5.25.

EXAMPLE 16

4-crotyloxy-3-methylphenylacetic acid 100.5 g. of 4-crotyloxy-3-methylphenylacetonitrile (0.5 mol) in 500 cc. of ethanol, 100 g. of potassium hydroxide and 100 cc. of water are refluxed for 4 hours. Maximum of alcohol is evaporated, one dilutes with water and ice, and the aqueous phase is washed with ether, acidified with 20% HCl; the solid is filtered, washed with water and petroleum ether. There are obtained 79.5 g. (yield: 78%) of acid which is recrystallised from petroleum ether; M.P.: 86–87.5° C.
  *Analysis.*—Calculated (percent): C, 70.88; H, 7.32. Found (percent): C, 70.52; H, 7.28.

EXAMPLE 17

4-n-amyloxy-3-methylphenylacetic acid 103.5 g. of 4-n-amyloxy-3-methylphenylacetonitrile (0.5 mol) in 500 cc. of ethanol, 100 g. of potassium hydroxide and 100 cc. of water are refluxed for 4 hours. Maximum of alcohol is evaporated, the residue is diluted with water and ice, and the aqueous phase is washed with ether, and acidified with 20% HCl, and the solid is filtered, washed with water and petroleum ether. There are obtained 85.1 g. (yield: 81%) of acid which is recrystallised from aqueous methanol; M.P.: 134–135° C.
  *Analysis.*—Calculated (percent): C, 71.16; H, 8.53. Found (percent): C, 71.02; H, 8.48.

In the same way, the following compounds were prepared.

3-chloro-4-metallyloxyhpenylacetic acid

M.P.: 77.5–78.5° C. (petroleum ether-benzene):
  Calculated (percent): C, 59.88; H, 5.44.
  Found (percent): C, 60.08; H, 5.49.

3-chloro-4-propargyloxyphenylacetic acid

M.P.: 101–102° C. (petroleum ether-benzene):
  Calculated (percent): C, 58.81; H, 4.04.
  Found (percent): C, 58.73; H, 3.95.

4-n-amyloxy-3-chlorophenylacetic acid

M.P.: 51–52° C. (acetic acid-water):
  Calculated (percent): C, 60.82; H, 6.67.
  Found (percent): C, 60.88; H, 6.68.

4-n-butyloxy-3-chlorophenylacetic acid

M.P.: 101–102.5° C. (hexane):
  Calculated (percent): C, 59.39; H, 6.23.
  Found (percent): C, 59.25; H, 6.15.

3-chloro-4-isopropyloxyphenylacetic acid

M.P.: 90–92° C. (hexane):
  Calculated (percent): C, 57.78; H, 5.73.
  Found (percent): C, 57.96; H, 5.70.

3-chloro-4-n-propyloxyphenylacetic acid

M.P.: 62–63° C. (cyclohexane):
  Calculated (percent): C, 57.77; H, 5.73.
  Found (percent): C, 57.68; H, 5.65.

3-fluoro-4-propargyloxyphenylacetic acid

M.P.: 93–95° C. (cyclohexane-benzene):
  Calculated (percent): C, 63.45; H, 4.36.
  Found (percent): C, 63.20; H, 4.29.

4-crotyloxy-3-fluorophenylacetic acid

M.P.: 84–86° C. (cyclohexane)
  Calculated (percent): C, 64.27; H, 5.84.
  Found (percent): C, 64.55; H, 5.80.

3-fluoro-4-metallyloxyphenylacetic acid

M.P.: 82–84° C. (cyclohexane):
  Calculated (percent): C, 64.27; H, 5.84.
  Found (percent): C, 64.31; H, 5.79.

4-n-butyloxy-3-fluorophenylacetic acid

M.P.: 85–86° C. (petroleum ether):
  Calculated (percent): C, 63.71; H, 6.63.
  Found (percent): C, 63.82; H, 6.58.

3-fluoro-4-n-propyloxyphenylacetic acid

M.P.: 99.5–101° C. (cyclohexane):
  Calculated (percent): C, 62.26; H, 6.17.
  Found (percent): C, 62.09; H, 6.15.

3-methyl-4-propargyloxyphenylacetic acid

M.P.: 94.5–95.5° C. (petroleum ether):
  Calculated (percent): C, 70.57; H, 5.92.
  Found (percent): C, 70.58; H, 5.84.

4-metallyloxy-3-methylphenylacetic acid

M.P.: 57–60° C. (methanol-water):
  Calculated (percent): C, 70.89; H, 7.32.
  Found (percent): C, 70.96; H, 7.28.

3-methyl-4-propyloxyphenylacetic acid

M.P.: 75–76° C. (hexane):
  Calculated (percent): C, 69.21; H, 7.74.
  Found (percent): C, 68.98; H, 7.72.

4-allyloxy-3-bromophenylacetic acid

M.P.: 82–83° C. (cyclohexane):
 Calculated (percent): C, 48.73; H, 4.09.
 Found (percent): C, 48.51; H, 3.92.

With respect to the preparation of alkaline and alkaline-earth salts of acids according to the invention, this is made in usual way, i.e. by treating an acid in alcoholic solution with an alcoholic solution of an alkaline or alkaline-earth salt, followed by evaporation of solvent.

EXAMPLE 18

Sodium salt of 3-chloro-4-allyloxyphenylacetic acid

To 22.6 g. of 3-chloro-4-allyloxyphenylacetic acid in 100 cc. of anhydrous methanol, 4 g. of sodium hydroxide in 200 cc. of anhydrous methanol are added. The methanol is then evaporated under vacuum. The residue is stirred with 100 cc. of anhydrous ether, filtered and dried under vacuum.

In a quite similar way, alkaline and alkaline-earth salts of various acids according to the invention are prepared, so that other examples are not considered as necessary.

With respect to amine salts of acids, a solution of the acid in a non-polar solvent is treated with the amine desired.

EXAMPLE 19

Butylamine 4-allyloxy-3-chlorophenylacetate 150 g. of 4-allyloxy-3-chlorophenylacetic acid are dissolved in 500 cc. of anhydrous ether. 50 g. of n-butylamine are added dropwise while vigorously stirring at room temperature. The precipitate is filtered and washed with ether. 190 g. of the amine salt is obtained; M.P.: 98–100° C. (ether-methanol).

EXAMPLE 20

Ethanolamine 4-allyloxy-3-chlorophenylacetate 160 g. of 4-allyloxy-3-chlorophenylacetic acid are dissolved in 500 cc. of anhydrous ether. One equivalent ethanolamine is added dropwise with vigorously stirring. The salt is filtered and washed with ether. 173 g. of salt is obtained; M.P.: 73–74.5° C. (ether-methanol).

In the same way, the following salts are prepared:

Triethanolamine 4-allyloxy-3-chlorophenylacetate;
 M.P.: 82–83° C. (ether-methanol)
Cyclohexylamine 4-allyloxy-3-chlorophenylacetate;
 M.P.: 133–134.5° C. (ether-methanol)
β-phenylethylamine 4-allyloxy-3-chlorophenylacetate;
 M.P.: 101–102° C. (ether-methanol)

N-diethylaminoethanol 4-allyloxy-3-chlorophenylacetate;
 M.P.: 54–56° C. (ether-methanol)
Papaverine 4-allyloxy-3-chlorophenylacetate
Codeine 4-allyloxy-3-chlorophenylacetate.

The acids and salts according to the invention are of low toxicity and are useful as pharmaceutic products, particularly as anti-inflammatory, analgesic, antipyretic and antispasmodic agents.

Said properties of new acids are shown hereinafter.

The values $LD_{50}$ of toxicity are given in mg./kg. of body weight on mice, the administration being made per os, the values between brackets giving the 95% confidence limits.

The tests relating to analgesic power were made by Siegmund method [see E. Siegmund, R. Cadmier and G. Lu, Proc. Soc. Exp. Biol. N.Y., 95:729 (1957)] and by the Randall and Selitto method [see Arch. Int. Pharmacodyn., III, 409 (1957)].

The Siegmund method gives the results for value $ED_{50}$ in mg./kg., the values between brackets giving the 95% confidence limits.

The Randall and Selitto method gives in terms of g. the maximum increase of the pain threshold.

The anti-inflammatory activity can be determined by the Benitz and Hall method [Arch. Int. Pharmacodyn., 144:1–2, 185 (1963)] giving the weight reduction of a carrageenin-induced abscess. The anti-inflammatory activity was also determined by the Cotton pellet granuloma test. We used a modified Meier test [Meier R., Schuler W. and Desaulles P., Experientia, 6, 469 (1959)]: the treatment by antiphlogistic agents starting three days after the insertion of the pellets. This procedure permits an assessment of the antiphlogistic power in chronic inflammatory processes and gives more precise information on the activity on tissular reaction of the tested compound.

The antipyretic activity has been determined by the following method: Fever is induced in rabbits by i.v. injection of antigonococcal vaccine (200 millions of bacteria per kg.). Otherwise, the technique is the same as that of Baker [Baker J. A., Hayden J., Marshall P. G., Palmer C. H. R., and Wittek T. D., J. Pharm. Pharmacol., 15, 97T (1963)]. Results are obtained in 10 rabbits for each compound, the administered dose being always the same (500 mg./kg.)]. Cross-over design is applied using acetylsalicylic acid as reference.

With respect to the antipyretic activity, if one considers that the aspirin has a value of 1, the comparative activity of 3-chloro-4-allyloxyphenylacetic acid is 4–5 and that of 3-methyl-4-allyloxyphenylacetic acid is 2.

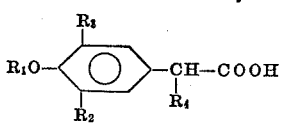

| $R_1$ | $R_2$ | $R_3$ | $R_4$ | $LD_{50}$, mg/kg., mice, per os | Analgesic activity | | Antiinflammatory activity | | Antipyretic activity |
|---|---|---|---|---|---|---|---|---|---|
| | | | | | Siegmund $ED_{50}$[1] | Randall-Selitto[2] | Abcess | Granuloma | |
| $CH_2=CH-CH_2$ | Cl | H | H | 1,100 (815–1,485) | 25 (17–38) | 110–400 | 0.5 | 1 | 5 |
| $CH_2=CH-CH_2$ | $CH_3$ | H | H | 850 (556–1,301) | 140 (95–206) | 108–400 | (0) | | 2 |
| $CH_2=CH-CH_2$ | $CH_3O$ | H | H | 2,250 (1,730–2,925) | 102 (66–158) | 33–400 | 0 | | |
| $CH_2=CH-CH_2$ | Cl | $CH_3$ | H | 1,025 (820–1,281) | 30 (20–45) | 79 (400) | 2 | | 5 |
| $CH_2=CH-CH_2$ | F | H | H | 1,900 (1,461–2,470) | 22.5 (15–33.5) | 62 (400) | 0.18 | 0.29 | 7 |
| $CH_2=CH-CH_2$ | Br | $CH_3$ | H | 1,650 (1,422–1,914) | 75 (47–120) | 64–400 | 0.5 | 0.3 | |
| $CH_2=CH-CH_2$ | Cl | Cl | H | 975 (757–1,257) | 22.5 (15–33.8) | 112 (400) | 4 | 2.0 | 4.0 |
| $CH_2=CH-CH_2$ | $CH_3$ | $CH_3$ | H | 1,425 (1,207–1,681) | 80 (45.7–140) | | 0.5 | | 4.5 |
| $CH_3-CH=CH-CH_2$ | $CH_3$ | H | H | | >400 | 13–400 | 0 | | |
| $CH_3-CH=CH-CH_2$ | Cl | $CH_3$ | H | | 73 (51–104) | | 0 | | |
| $CH_3-CH=CH-CH_2$ | F | H | H | 2,150 (1,748–2,645) | 98 (44.5–215.6) | 83–400 | 0 | 0.1 | |
| $CH_3-CH=CH-CH_2$ | $C_2H_5O$ | H | H | 1,825 (1,351–2,463) | >400 | 80 (400) | 0 | | |
| $CH\equiv C-CH_2$ | Cl | H | H | 1,025 (603–1,743) | 66 (45–97) | 117–400 | 0 | | 4.5 |
| $CH\equiv C-CH_2$ | $CH_3$ | H | H | 920 (752–1,168) | 310 (207–465) | 191–400 | 0 | | |
| $CH\equiv C-CH_2$ | $CH_3O$ | H | H | | 102 (51–204) | 153–400 | | | |
| $CH\equiv C-CH_2$ | Br | $CH_3$ | H | 960 (653–1,411) | 47 (26–85) | 69 (400) | 0 | | |
| $CH\equiv C-CH_2$ | F | H | H | 1,125 (833–1,519) | 22.5 (14.2–35.6) | 131–400 | 0.36 | 0.24 | 7 |
| $CH\equiv C-CH_2$ | Cl | Cl | H | 840 (672–1,050) | 22 (11.6–41.8) | 105 (500) | 6 | 5.3 | 4 |
| $CH\equiv C-CH_2$ | $C_2H_5O$ | H | H | ±2,350 | 162.9 (95.5–276) | 46–400 | 0 | | |
| $CH\equiv C-CH_2$ | $CH_3$ | $CH_3$ | H | 1,425 (1,168–1,738) | 65 (47–90) | 79 (400) | 1.5 | 0.5 | 3 |
| $CH_3-CH_2-CH_2$ | Cl | H | H | 1,160 (947–1,421) | 37 (26–52.5) | 67 (400) | 1 | 0.3 | 2.5 |
| $(CH_3)_2-CH$ | Cl | H | H | 1,400 (1,120–1,750) | 138 (76–248) | 87 (400) | 3.6 | 0.61 | 5 |

See footnotes at end of table.

TABLE—Continued

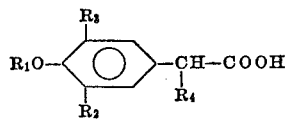

| R₁ | R₂ | R₃ | R₄ | LD₅₀, mg/kg., mice, per os | Analgesic activity Siegmund ED₅₀[1] | Randall-Selitto[2] | Antiinflammatory activity Abcess | Granuloma | Antipyretic activity |
|---|---|---|---|---|---|---|---|---|---|
| CH₂=C(CH₃)—CH₂ | Cl | H | H | >4,000 | 72 (53-97) | 58 (400) | 0.5 | | 3.5 |
| CH₂=C(CH₃)—CH₂ | F | H | H | 920 (613-1,380) | 42 (19-92) | 82-400 | 0.1 | 0.2 | |
| C₆H₅—CH=CH—CH₂ | Cl | H | H | 1,425 (1,105-1,838) | 265 (133-520) | | 0 | | |
| C₆H₅—CH=CH—CH₂ | CH₃ | H | H | 1,400 (1,076-1,820) | 240 (49.5-264) | | 0 | | |
| CH₂=CH—CH₂ | IsoC₃H₇ | H | H | 1,600 (1,269-2,016) | >400 | 50 (400) | 0.25 | | 0 |
| CH₃—(CH₂)₃ | Br | H | H | 1,525 (1,017-2,287) | >400 | 139 (400) | (3) | | |
| Phenylbutazone | | | | | | 125 | 1 | 1 | |
| Aspirin | | | | | 76 (46.8-120) | | | | 1 |
| CH₂=CH—CH₂ | Cl | CH₃O | H | 1,250 (932-1,675) | 130 (76-222) | 103 (400) | 1.5 | | 3.5 |
| CH₂=CH—CH₂ | Br | H | H | 1,175 (783-1,762) | 115 (67-207) | 111 (400) | 4.3 | | |
| CH₂=CH—CH₂ | Br | Br | H | 1,325 (854-2,053) | 132 (71-244) | | 0.4 | | |
| CH₂=CH—CH₂ | Br | Cl | H | 1,250 (1,083-1,560) | 90 (53-153) | | 1.1 | | |
| CH₂=CH—CH₂ | Cl | H | CH₃ | 1,300 (1,102-1,534) | 32 (16-64) | | | 0 | |
| CH₂=CH—CH₂ | Cl | I | H | 1,050 (875-1,260) | 160 (57-448) | | | | |
| CH₃(CH₂)₂ | CH₃ | H | H | 1,600 (1,311-1,952) | >400 | 66 (400) | 0.5 | 0.7 | |
| CH₃(CH₂)₂ | C₂H₅O | H | H | | ±400 | 159 (400) | 0 | | |
| CH₃(CH₂)₂ | F | H | H | 2,150 (1,592-2,902) | 45 (15-135) | 80 (400) | 0.5 | 0.15 | 2.5 |
| CH₃(CH₂)₂ | Cl | Cl | H | 1,550 (1,107-2,170) | 25 (15-40) | | 2 | 0.3 | 3 |
| CH₃(CH₂)₂ | CH₃ | CH₃ | H | 1,200 (800-1,800) | >400 | 86 (400) | 0 | | |
| CH₃(CH₂)₂ | Br | CH₃ | H | ±2,500 | ±400 | 92 (400) | 1.2 | 0.5 | 2.5 |
| isoC₃H₇ | F | H | H | 1,980 (1,100-3,564) | 100 (29-350) | | | 0 | 3.5 |
| CH≡C—CH₂ | Cl | Cl | H | 840 (672-1,050) | 22 (11.6-41.8) | 105 (400) | 5 | 5.3 | 5 |
| CH≡C—CH₂ | C₂H₅ | H | H | 2,000 (1,429-2,800) | | | 0 | | |
| CH≡C—CH₂ | IsoC₃H₇ | H | H | 850 (630-1,149) | 280 (155-504) | | 0 | | |
| CH≡C—CH₂ | Br | H | H | 1,500 (1,278-1,995) | 160 (94-272) | | 0.6 | | |
| CH≡C—CH₂ | Br | Cl | H | 950 (812-1,112) | 30 (21-44) | | 1.4 | 1.7 | |
| CH≡C—CH₂ | Cl | H | CH₃ | 1,400 (1,102-1,778) | 19.5 (14.7-25.7) | | 0.15 | | |
| CH₂=C(CH₃)—CH₂ | Br | CH₃ | H | 1,950 (1,258-3,022) | >400 | 80 (400) | 0.30 | 0 | |
| CH₂=C(CH₃)—CH₂ | CH₃ | H | H | 1,700 (1,453-1,989) | 160 (42-608) | | 0 | | |
| CH₃—CH=CH—CH₂ | CH₃ | CH₃ | H | 1,725 (1,268-2,346) | ±225 | | 0 | | |
| C₆H₁₁ (cyclohexyl) | Cl | H | H | 1,625 (1,250-2,112) | 64 (40-104) | | 0 | | 2 |
| CH₃(CH₂)₄ | CH₃ | H | H | 2,100 (1,641-2,688) | 74 (41-133) | 65 (400) | 0 | | |
| CH₃(CH₂)₃ | IsoC₃H₇ | H | H | 1,525 (1,212-1,799) | >400 | 131 (400) | 0 | | |
| CH₃(CH₂)₃ | Cl | H | H | 1,550 (1,292-1,860) | >400 | 112 (400) | 0.5 | | |
| CH₃(CH₂)₄ | Cl | H | H | 2,300 (1,533-3,450) | >400 | 35 (400) | 0 | | |
| CH₂=CH—CH₂ | C₂H₅ | H | H | 1,650 (1,289-2,112) | >400 | | 0 | | |
| CH₃ | Cl | H | CH₃ | 2,500 (1,592-3,925) | 123 (72-209) | | 0 | | |
| secC₄H₉ | Cl | H | H | 1,600 (1,280-2,000) | 110 (61-198) | | 0.2 | | 4 |
| Phenylbutazone | | | | | | | 1 | 1 | |
| Aspirin | | | | | | | | | 1 |

[1] Data are given in mg./kg.; ( ) 95% confidence limits.
[2] Maximal increase of the pain threshold expressed in grams and observed 30 minutes after treatment; the bracketed values being the mg./kg. doses giving this maximal increase.
[3] Retained for screening.

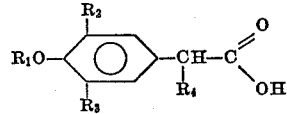

| R₁ | R₂ | R₃ | R₄ | LD₅₀, mg./kg., mice, per os | Analgesic activity Siegmund ED₅₀[1] | Randall and Selitto[2] | Antiinflammatory activity Abcess | Granuloma | Antipyretic activity |
|---|---|---|---|---|---|---|---|---|---|
| NC₃H₇ | Cl | CH₃ | H | ±2,500 | ±400 | 92 (400) | 2.1 | 0.5 | 2.5 |
| IsoC₄H₉ | Cl | H | H | 2,325 (2,004-2,650) | 153 (91-257) | | 1.2 | | |
| C₆H₅—CH₂— | Cl | H | H | 1,525 (1,399-1,662) | | | | 1 | |
| IsoC₅H₁₁ | Cl | H | H | | >400 | | + | | |
| F—C₆H₄—CH₂ | Cl | H | H | | 153 (76.5-306) | | (3) | | |
| NC₆H₁₃ | Cl | Cl | H | | >400 | | (3) | | |
| IsoC₅H₁₁ | Cl | Cl | H | 1,400 (1,029-1,904) | 250 (104-600) | | (3) | | |
| NC₅H₁₁ | Cl | Cl | H | 1,200 (945-1,524) | >400 | | + | | |
| NC₇H₁₅ | Cl | Cl | H | | >400 | | + | | |
| NC₈H₁₅ | Cl | Cl | H | | >400 | | + | | |

See footnotes at end of table.

TABLE—Continued

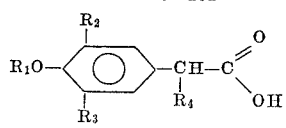

| $R_1$ | $R_2$ | $R_3$ | $R_4$ | $LD_{50}$, mg./kg., mice, per os | Analgesic activity Siegmund $ED_{50}$[1] | Analgesic activity Randall and Selitto[2] | Antiinflammatory activity Abcess | Antiinflammatory activity Granuloma | Antipyretic activity |
|---|---|---|---|---|---|---|---|---|---|
| CH₃O—⟨Cl⟩—CH₂— | Cl | H | H | >4,000 | >400 | | + | | |
| Cl—⟨Cl⟩—CH₂— | Cl | H | H | | ±400 | | (³) | | |
| Cl—⟨ ⟩—CH₂— | Cl | H | H | 1,600 (1,368–1,872) | 82 (29–229) | | | | |
| SecC₄H₉ | Cl | Cl | H | 1,800 (1,250–2,250) | 27 (13.7–53.2) | | 1.2 | | |
| NC₄H₉ | Cl | Cl | H | | 125 (38–406) | | 1.2 | | |
| CH₃—⟨ ⟩—CH₂— | Cl | H | H | | 290 (138–609) | | 0.25 | | |
| IsoC₄H₉ | Cl | Cl | H | | ±400 | | 3.2 | | |

[1] Data are given in mg./kg.; ( ) 95% confidence limits.
[2] Maximal increase of the pain threshold expressed in grams and observed 30 minutes after treatment; the bracketed values being the mg./kg. doses giving this maximal increase.
[3] Retained for screening.

PHARMACOLOGICAL DATA: STANDARDS

| Compound | $LD_{50}$, mg./kg., mice, per os | Analgesic activity Siegmund $ED_{50}$[1] | Analgesic activity Randall and Selitto[2] |
|---|---|---|---|
| Aspirin | 1,500 | 76 (46.8–120) | 125 (100) |
| Phenacetine | 1,220 | 94 (63–111) | 53 (400) |
| Propoxyphene | 290 | 30.5 (21.5–43.3) | 311 (80) |
| Codeine | 395 | 17 (11.3–25.5) | |
| Aminopyrine | 1,090 | 110 (71–171) | 83 (400) |
| Phenylbutazone | 290 | 93 (58–150) | 0 (200) |

[1] Data are given in mg./kg. ( ) 95% confidence limits.
[2] Maximal increase of the pain threshold expressed in grams and observed 30 minutes after treatment; the bracketed values being the mg./kg. doses giving this maximal increase.

The instant compounds also exhibit a myorelaxant activity:

Antagonism to strychnine lethality was studied according to R. A. Turner (Screening Methods in Pharmacology—ed.: Academic Press, p. 171—1965). The mice were orally or s.c. treated 1 h. before the i.v. injection of strychnine sulfate at a dose of 0.075 mg./kg. The 0.01% strychnine sulfate solution was injected at a rate of 0.02 ml./sec. The animals which survived 30 min. following the injection were considered as protected. Each dose of the drugs was tested in at least 10 animals; control groups were constituted and treated with the excipient alone.

Results for 3-chloro-4-isopropyloxyphenylacetic acid (CP 1044 CG 103) and for the salt of this acid with ethanolamine (CP 1044 CG 103 A).

| Compound | Dose, mg./kg. | Route of administration | Number of protected mice |
|---|---|---|---|
| Controls | 0 | Per os | 0/20 |
| CP 1044, CG 103 | 25 | Per os | 0/10 |
|  | 50 | | 0/10 |
|  | 100 | | 1/10 |
|  | 200 | | 3/10 |
|  | 400 | | 3/10 |
|  | 600 | | 4/10 |
|  | 800 | | 4/10 |
| Mephenesin | 400 | Per os | 2/10 |
|  | 600 | | 4/10 |
|  | 800 | | 5/10 |
| Controls | 0 | S.c. | 0/20 |
| CP 1044, CG 103 A | 100 | S.c. | 0/10 |
|  | 200 | | 2/10 |
|  | 400 | | 6/10 |
|  | 600 | | 9/10 |
|  | 800 | | 9/10 |

CONCLUSION

Orally administered, myorelaxant activity of CP 1044 CG 103 was the same as for mephenesin.

The product administered by s.c. route had an $ED_{50}$ of 335 mg./kg. and gave a nearly total protection at 600 mg./kg. (90%); in the same test the ethanolamine salt of 4-allyloxy-3-chlorophenylacetic acid (Mervan) had a $ED_{50}=800$ mg./kg. by s.c. administration.

Clinical evaluation of analgesic, anti-inflammatory and antipyretic activities of 4-allyloxy-3-chlorophenylacetic acid, 4-allyloxy-3,5-dichlorophenylacetic and 3-chloro-4-iso-propyloxyphenylacetic acid in man

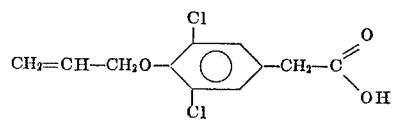

is hereinafter referred to as "Mervan," the registered trademark therefor.

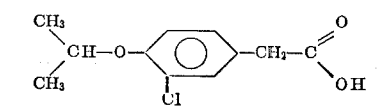

is hereinafter referred to as CG 90.

$$CH_3\diagdown CH-O-⟨ ⟩-CH_2-C\diagup O \diagdown OH$$ (with Cl substituent)

is hereinafter referred to as CG 103.

(1) Analgesic activity.—The results of double-blind controlled trials appear in Table 1; the method of Houde et al. is adopted (Houde R. W., Wallenstein M. S. and Rogers A.—Clinical Pharmacology of Analgesics: Clin. Pharm. and Therap., 1960, 1, 1963).

Mervan and CG 103 appear very active since the pain relief obtained with the two compounds is comparable to that obtained by narcotic analgesics like morphine and codeine, and superior to that of aspirin. Preliminary trials performed on CG 90 indicate a similar activity for this compound.

Kinetic studies of Mervan show a good relationship between analgesic activity and blood levels (see FIG. 1).

(2) Anti-inflammatory activity.—The results for Mervan are provided in Table 2; its activity is comparable to that of phenylbutazone and indomethacin, but the tolerance to Mervan is much better than that to the two reference substances. In double-blind studies, the therapeutic results are expressed according to the opinion of the physician and the preference of the patients.

Concerning the therapeutic activity of CG 103 and CG 90, clinical pilot trials have been undertaken, indicating a very good activity for both compounds: daily doses of 1000 to 3000 mg. CG 103 or 700 mg. CG 90 are used. These trials are performed on patients with rheumatic diseases. Myorelaxant activity of CG 103 seems confirmed in man.

(3) Antipyretic activity.—Administered orally or parentally, at the dose of 400 mg., all cases a clearcut drop in temperature.

Its efficacy in this field was also proven in patients suffering from influenza.

(4) Tolerance-Toxicity.—Generally speaking the tolerance to Mervan, CG 90 and CG 103 is very good; doses up to 6 g./day for Mervan, 3.2 g./day for CG 103 and 1 g./day for CG 90 have been administered for long periods of time. Only a few cases of gastric intolerances and cutaneous rashes have been noted. Body weight, arterial pressure, hematology and blood chemistry were never affected by the treatments, also renal and hepatic functions are not altered.

As shown in Table 3, *acute toxicity* of this compound is comparable to that of acetylsalicylic acid, aminopyrine or phenacetine, but much lower than that of codeine, propoxyphene, benzylamine or phenylbutazone.

Chronic toxicity studies [1] were undertaken in rats, monkeys and dogs; the toxicity is particularly weak in the two latter species, in which it was proven that the metabolism of the compound is the most similar to that of man. In the dog, daily doses up to 350 mg./kg. given for three months, seven days a week, do not entail any toxic symptom; in the monkey, in similar conditions, doses up to 250 mg./kg./day are perfectly tolerated during one year. Finally, studies in rats, mice and rabbits indicate that Mervan is devoid of teratogenic action.

ACUTE TOXICITY OF MERVAN

| Species | Route of administration | $LD_{50}$ and 0.95 confidence limits, mg./kg. | Slope S and 0.95 confidence limits |
|---|---|---|---|
| Mice | P.O. | 1,100 (815–1,485) | 1.67 (1.32–2.13) |
| Do | S.C. | 600 (526–684) | 1.24 (1.03–1.49) |
| Do | I.v. | 585 (547–626) | 1.12 (1.00–1.26) |
| Do | I.p. | 555 (539–572) | 1.13 (1.08–1.19) |
| Rats | P.o. | 1,050 (882–1,250) | 1.34 (1.21–1.49) |
| Do | S.c. | 630 (581–683) | 1.14 (1.04–1.26) |
| Do | I.p. | 530 (421–668) | 1.30 (1.05–1.61) |

The analgesic activity of Mervan is investigated in four tests in which the nature and origin of the pain are different. In the Siegmund test[2, 3] where the pain is provoked by a chemical stimulus, Mervan appears equivalent to codeine and propoxyphene, twice as active as benzylamine and glaphenine and three times as active as acetylsalicylic acid (Table 4).

TABLE 1.—ANALGESIC ACTIVITY
[All double-blind controlled studies]

| Number of patients | Tested compound | Daily dosage, mg. | Standard | Daily dosage, mg. | Route | Nature of pain | Activity |
|---|---|---|---|---|---|---|---|
| 18 | Mervan | 500 | Codeine | 30 | P.o. | Cancer | Mervan significantly superior. |
| 49 | do | 600 | do | 30 | Rectal | do | Comparable for both drugs. |
| 44 | do | 500 | Pentazocine | 50 | P.o. | do | Do. |
| 20 | do | 500 | do | 30 | I.m. | do | Do. |
| 8 | do | 500 | Morphine | 10 | I.m. | do | Ratio 1/160. |
| | | 1,000 | | 20 | | | |
| 40 | do | 1,000 | Aspirin | 1,000 | P.o. | Post-partum | Mervan significantly superior. |
| 20 | CG 103 | 100 | Placebo | | P.o. | Neurologic | CG 103 better than placebo. |
| 20 | CG 103 | 500 | Pentazocine | 50 | P.o. | do | Comparable for both drugs and significantly superior to placebo. |

TABLE 2.—ANTI-INFLAMMATORY ACTIVITY
[All comparisons are done according to a double-blind design]

| Number of patients | Mervan daily dosage and duration | Standard | Daily dosage, mg. | Route | Affection | Assessment | |
|---|---|---|---|---|---|---|---|
| | | | | | | Activity | Tolerance |
| 29 | 1,500 mg., 1 week. | Phenylbutazone | 300 | P.o. | Osteoarthritis | Similar for both drugs | Mervan better. |
| 47 | 3,000 mg., 1 month. | Indomethacin | 75 | P.o. | Osteoarthritis and rheumatoid arthritis. | do | Do. |
| 16 | 3,000 mg., 1 month. | No | | P.o. | Rheumatoid arthritis. | In 2/3 of the cases it was possible to reduce steroid administration. | Very good. |
| 61 | 3,000 mg., 7–153 days. | No | | P.o. | 38—rheumatoid arthritis; 23—osteoarthritis. | Very good results obtained in 60% of the cases. | Do. |

PHARMACOLOGY OF MERVAN

Our studies bearing on arylacetic acids and their derivatives allowed us to select a series of new compounds showing particularly strong analgesic and antipyretic properties; one of them, Mervan, is of great interest for its high potency in these fields and for its low toxicity (I)

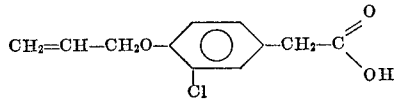

(I)

---
[1] Lambelin G., Roba J., Gillet C., Gautier M. and Buu-Hoï N. P.: Arzn. Forsch. (in the press).
[2] Koster, R., Anderson, M. and De Beer, E. J.: Fed. Proc., *18*, 412 (1959).
[3] Siegmund, E., Cadmier, R. and Lu, G.: Proc. Soc. Exp. Biol. N.Y., *95*, 729 (1957).

TABLE 4.—SIEGMUND TEST

[Drugs administered orally 30 minutes before the intraperitoneal injection of acetic acid solution]

| Compound | $ED_{50}$ and 0.95 confidence limits (mg./kg.) | Slope S | Potency ratio [1] and 0.95 confidence limits | | Maximum protection rate [2], percent |
|---|---|---|---|---|---|
| Mervan | 25 (16.6–38.0) | 5.34 | | 1 | 85 (200) |
| Codeine | 17 (11.3–25.5) | 3.80 | | [3] 1.50 | 100 (80) |
| Propoxyphene | 30.5 (21.5–43.3) | 2.67 | | [3] 0.83 | 85 (100) |
| Pentazocine | 38 (29.2–49.4) | 2.10 | | (4) | 80 (80) |
| Benzylamine | 50.5 (35.3–72.2) | 2.70 | 0.50 [5] | (0.29–0.85) | 95 (200) |
| Glaphenine | 60 (30.0–120.0) | 5.00 | 0.42 [5] | (0.19–0.93) | 85 (400) |
| Acetylsalicylic acid | 75 (46.8–120.0) | 5.82 | 0.33 [5] | (0.18–0.62) | 90 (800) |
| Phenacetine | 94 (63.0–141.0) | 3.38 | 0.27 [5] | (0.13–0.55) | 85 (400) |
| Aminopyrine | 110 (71–171) | 4.28 | 0.23 [5] | (0.13–0.41) | 80 (400) |
| Paracetamol | 180 (120–270) | 3.46 | 0.14 [5] | (0.08–0.25) | 80 (400) |

[1] Mervan considered as unit.
[2] Maximum tested dose in mg./kg. in parentheses.
[3] Non significantly different from 1 at the threshold $\alpha=0.05$.
[4] Lack of parallelism.
[5] Significantly different from 1 at the threshold $\alpha=0.05$.

In the Randall and Selitto test[4], pain is induced by pressure on the inflamed paw of the rat. In this test Mervan appears about seven times less active than codeine, it is at least equal to glaphenine and slightly superior to aminopyrine and benzylamine.

In the hot plate test[5], comparison between Mervan, codeine and acetylsalicylic acid is possible; the potency ratio between Mervan and codeine being not significantly different from 1, the two drugs must be considered as equally potent. Both drugs are much more active than acetylsalicylic acid: Mervan is estimated to be fifty seven times as active as this standard. It is well-known that the non-narcotic analgesics like paracetamol, glaphenine and acetylsalicylic acid are practically devoid of activity in this test. It seems thus that the analgesic activity of Mervan might be quite different than that of the so-called "mild analgesics." It was therefore important to investigate the possibility of addiction liability of the drug, but the Straub tail test in mice and investigations in monkeys, physically dependent on 3 mg./kg. morphine, indicate that this hypothesis can be discarded[6].

A last test for analgesic activity, using electrical stimulus, the Blake test[7], gives a new comparison of Mervan and codeine. Results show that the intensity of the analgesic activity is comparable for both drugs.

Finally, reviewing the data on the activity of Mervan, one must point out that its analgesic effective doses do not depress the central nervous system; moreover, tranquilizing and myorelaxant properties do not seem to be involved in the analgesic action of the drug.

Figure 2:
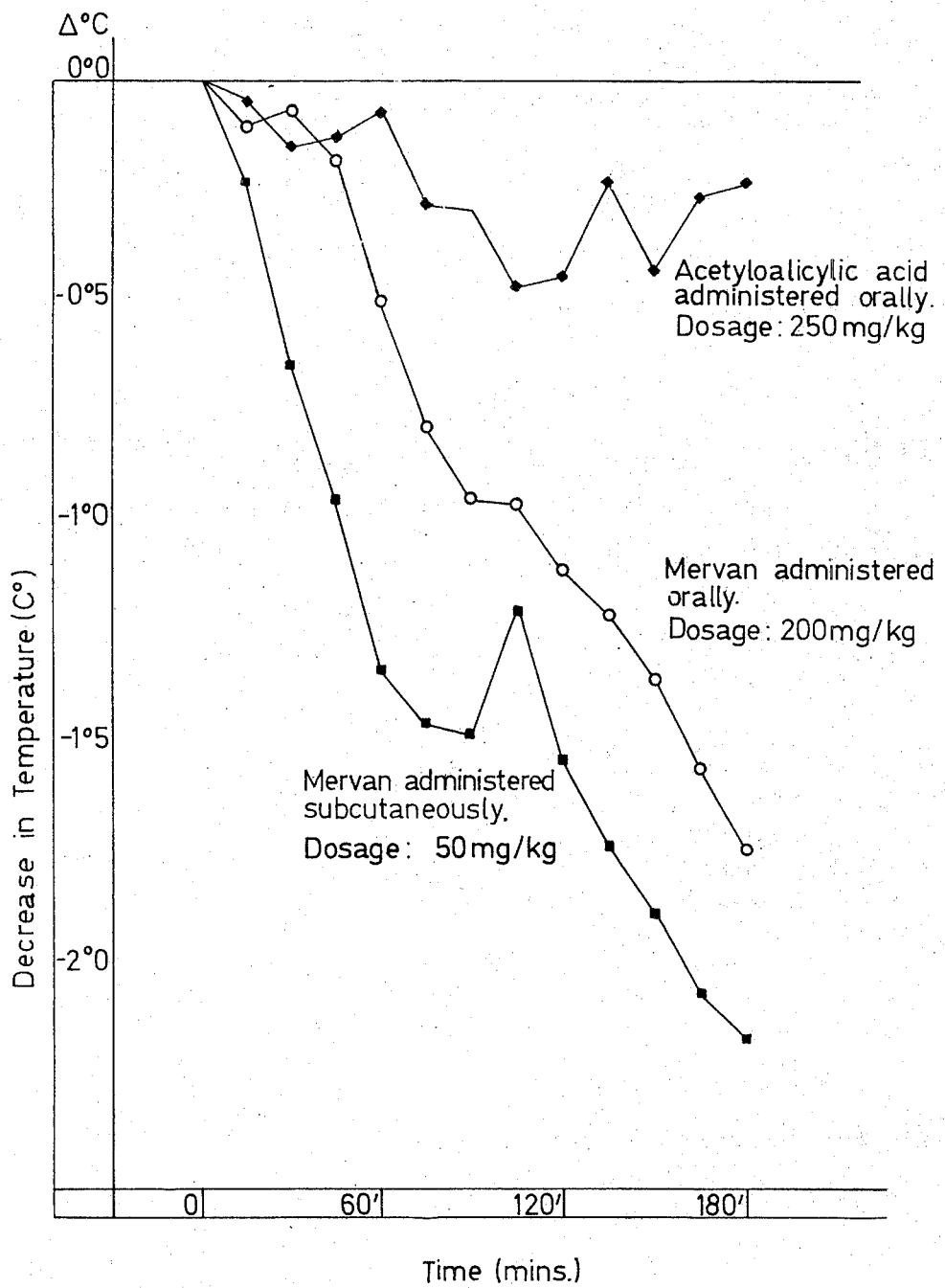

The antipyretic activity of Mervan was studied in rabbits rendered hyperthermic by intravenous injections of antigonococcic vaccine. The experiments were conducted according to a cross-over design, each animal receiving at different moments the drugs to be tested and lactose as a control treatment. It was found that Mervan 200 mg./kg. per os was more active than acetylsalicylic acid 250 mg./kg., and that a subcutaneous administration of 50 mg./kg. Mervan practically inhibited the response to the pyrogen. Typical temperature reduction curves are shown in FIG. 2; they delimit with the zero base line (which represents the temperature under control treatment). Since Mervan reduced temperature by more than 2° C., while acetylsalicylic acid reduced it by only 0.5° C., it is possible to assume that Mervan orally administered is about five times more active than acetylsalicylic acid. On the other hand, it was proven that effective antipyretic doses of Mervan are devoid of hypothermic activity in the normal rabbit.

The anti-inflammatory activity of Mervan was investigated in acute and in chronic inflammatory processes. In the carrageenin-induced oedema of the rat hind-paw,[8] Mervan was compared to phenylbutazone. The results recorded in Table 5 indicate that Mervan is slightly but not significantly superior to the standard. The experiment shows also that the anti-inflammatory activity of our compound is not dependent on the presence of the adrenals.

TABLE 5.—CARRAGEENIN INDUCED OEDEMA OF THE RAT HIND PAW

| Compound | Dose, mg./kg. | Route of administration | Number of rats | Norm. or adren.[1] | $R_{max.}/R_0$ | Means ±S.E.[2] | Equation of the regression line | Potency ratio |
|---|---|---|---|---|---|---|---|---|
| Controls | 0 | P.o. | 9 | Norm | 2.19 | ±0.13 | | |
| Mervan | 20 / 40 / 80 | P.o. | 9 / 9 / 9 | Norm | 1.88 / **1.76 / **1.55 | ±0.10 / ±0.10 / ±0.09 | Y=2.5870−0.5352 X | [3] 1.11 |
| Phenylbutazone | 20 / 40 / 80 | P.o. | 9 / 9 / 9 | Norm | *1.87 / *1.79 / **1.60 | ±0.06 / ±0.09 / ±0.09 | Y=2.46 410.4429 X | 1 |
| Controls | 0 | S.c. | 10 | Norm | 2.10 | ±0.08 | | |
| Mervan | 25 / 100 | S.c. | 10 / 10 | Norm | 1.78 / **1.57 | ±0.09 / ±0.08 | Y=2.2746−0.3538 X | [3] 1.52 |
| Phenylbutazone | 25 / 100 | S.c. | 10 / 10 | Norm | 1.90 / **1.60 | ±0.15 / ±0.06 | Y=2.6065−0.5033 X | 1 |
| Controls | 0 | S.c. | 9 | Adren | 2.73 | ±0.28 | | |
| Mervan | 100 | | 9 | | ***1.51 | ±0.09 | | |

[1] Norm.=normal; Adren.=adrenalectomized animals.
[2] Statistical symbols (*,  and *) are used here for the comparison of the means of treated animals with those of the corresponding controls; *, , *: significant difference at the threshold $\alpha=0.05, 0.01, 0.001$ respectively.
[3] Nonsignificantly different from 1.

Adjuvant-induced polyarthritis in the rat according to Glenn [9, 10] was the test chosen to investigate the activity of Mervan in chronic inflammatory processes. Table 6 shows the results obtained by prophylactic treatment with Mervan and with phenylbutazone. A significant protection was obtained in the treated groups as compared to the controls.

Especially in the second experiment in which the drugs are subcutaneously administered and where no mortality

---

[4] Randall, L. O. and Selitto, J. J.: Arch. Int. Pharmacodyn, *111*, 409 (1957).
[5] Eddy, N. B., and Leimbach, O.: J. Pharmacol. Exp. Ther *107*, 385 (1953).
[6] May, E. L.: Personal Communication (1969).
[7] Blake, L., Graeme, M. L. and Sigg, E. B.: Med. Exp. *9*, 146 (1963).
[8] Winter, C. A., Risley, E. A. and Nuss, G. W.: Proc. Soc. Exp. Biol. Med., *111*, 544 (1962).
[9] Glenn, E. M. and Gray, J.: Am. J. Vet. Res., *26*, 114, 1180 (1965).
[10] Glenn, E. M.: Am. J. Vet. Res., *27*, 116, 339 (1966).

is recorded, a clear dose-effect relationship exists, both for Mervan and for phenylbutazone in the two main parameters, i.e. scores and incidence; no significant difference appearing between the results obtained with the two drugs.

a warm solution of gelatine 20 l. and about 10 l. of cold water (20° C.).

The resulting damp granules were passed through a No. 4 mesh screen (aperture size 5.13 mm.); trayed and dried at 50° C. for about 16 hours in an oven.

TABLE 6.—ADJUVANT-INDUCED POLYARTHRITIS IN THE RAT: PREVENTIVE TREATMENT (20 ANIMALS/DOSE).

| Compound | Daily doses, mg./kg. | Route of administration | Scores: means±S.E. | | Incidence [1] | | Body weight gain Means ±S.E., g. | Mortality |
|---|---|---|---|---|---|---|---|---|
| | | | On day 15 | On day 21 | On day 15 | On day 21 | | |
| Controls | 0 | P.o. | 5.17 ±1.19 | 6.41 ±1.53 | 14/18 | 12/17 | −7.00 ±7.89 | 3 |
| Mervan | 25 / 100 | P.o. | (**0.72 ±0.50 / **0.60 ±0.25 | **0.94 ±0.40 / **0.93 ±0.40 | ***2/18 / **5/15* | *6/18 / 5/15* | [2] 6.87+ 2.00± / [2] +2.08 ±5.18 | [2] 2 / [2] 5 |
| Phenylbutazone | 25 / 100 | P.o. | (*2.25 ±1.02 / **0.29 ±0.22 | **3.00 ±1.13 / **0.83 ±0.34 | *6/16 / ***2/14 | [2] 8/15 / [2] 6/12 | [2] −2.53 ±6.76 / [2] −10.69 ±5.22 | [2] 5 / [2] 8 |
| Controls | 0 | S.c. | 5.10 ±0.94 | 6.30 ±1.15 | 18/20 | 18/20 | −11.50 ±8.00 | 0 |
| Mervan | 25 / 100 | S.c. | (2.15 ±0.74 / 0.65 ±0.27 | 2.10 ±0.55 / 1.40 ±0.66 | *8/20 / *5/20 | *11/20 / *6/20 | [2] +1.20 ±8.50 / +19.20 ±7.80 | 0 / 0 |
| Phenylbutazone | 25 / 100 | S.c. | (1.80 ±0.61 / 0.45 ±0.22 | 2.40 ±0.70 / 1.35 ±0.42 | 9/20 / *5/20 | *12/20 / 9/20 | +17.60 ±7.50 / +**14.50 ±6.30 | 0 / 0 |

[1] Incidence: number of animals presenting arthritic lesions.
[2] Nonsignificantly different from the corresponding controls at the threshold α=0.05.
*, , *: significantly different from the corresponding controls at the threshold α=0.05, 0.01, 0.001 respectively.

The curvative oral treatment of well established polyarthritis in the rat began fourteen days after the inoculation. The evolution of the arthritic scores is given in Table 7. Mervan and phenylbutazone showed a good anti-inflammatory activity in this test; the severity of the lesions decreasing regularly in the treated animals. When comparing the scores within the treated groups no significant differences are noted at any time between Mervan and phenylbutazone.

Consequently, Mervan appears as potent as phenylbutazone with respect to antipholgistic activity, in both acute and chronic inflammatory processes.

The dried granulation was then passed through a No. 8 mesh screen (aperture size 1.95 mm.) and a No. 14 mesh screen (aperture size 1.25 mm.).

After being thoroughly mixed with corn starch and aerosil composition, the granulated material was compressed into tablets weighting 650 mg. each.

Punch diameter: 13 mm.
Average weight: 650 mg.
Hardness: 10–15 kg. stokes.
Disintegration time—before 10 min.
Friability—not more than 0.5%.

TABLE 7.—ADJUVANT-INDUCED POLYARTHRITIS IN THE RAT: CURATIVE TREATMENT

| Compound | Daily dose, mg./kg. | Number of rats | Scores (Means±S.E.) | | | | | | | Bodyweight gain, g. means ±S.E. |
|---|---|---|---|---|---|---|---|---|---|---|
| | | | Day 14 (before treatment) | Day 17 | Day 19 | Day 21 | Day 24 | Day 26 | Day 28 | |
| Controls | 0 | 17 | 5.18 ±1.02 | 6.47 ±1.07 | 7.06 ±0.98 | 7.71 ±1.06 | 7.47 ±1.18 | 7.76 ±1.18 | 7.58 ±1.15 | 9.18 ±6.30 |
| Mervan | 100 | 13 | [1] 5.53 ±1.21 | [1] 4.92 ±1.02 | *3.61 ±0.67 | [1] 4.92 ±1.06 | *4.31 ±0.92 | *4.15 ±0.93 | 3.53 ±0.65 | [1] 10.15 ±5.1 |
| Phenylbutazone | 100 | 13 | [1] 5.85 ±1.24 | [1] 5.46 ±1.10 | *3.69 ±0.84 | *3.54 ±0.75 | *3.08 ±0.64 | **2.61 ±0.50 | **2.46 ±0.53 | [1] 14.62 ±5.07 |

[1] Nonsignificantly different from the controls at the threshold α=0.05.
* Significantly different from the controls at the threshold α=0.05.
** Significantly different from the controls at the threshold α =0.01.

The acids and salts according to the invention can be administrated alone or in combination with other pharmaceutical products having a similar or different activity.

The compounds of the present invention can be administered in tablet form, suppository form, or by subcutaneous injection. From the foregoing description, it is within the skill of the art to formulate appropriate compositions for these various forms of administration. However, typical formulations for the manufacture of Mervan tablets, suppositories, and injectable liquid are set forth, by way of example, hereinbelow.

MANUFACTURE OF MERVAN TABLES

| The basic formulation is | For 1 tablet, mg. | For a batch of 200,000 tablets, Kg. |
|---|---|---|
| 4-allyloxy-3-chlorophenyl acetic acid (Mervan) | 500 | 100 |
| Prejel (a starch soluble binder) | 50 | 10 |
| Gelatine | 10 | 2 |
| Glycerin | 0.2 | 0.04 |
| Corn starch | 80 | 16 |
| Aerosil composition (diatomite used as glider) | 10 | 2 |
| Total | 650 | 130 |

The Mervan and prejel were thoroughly mixed and passed through a comminuting mill to insure uniformity.

A 10% gelatine was made by dissolving in warm water with glycerin (20l).

The mixture of prejel and Mervan was granulated with

MANUFACTURE OF MERVAN INJECTABLE LIQUID

| The basic formulation is | For 1 ampoule, mg. | For a batch of 10,000 ampoules kg. |
|---|---|---|
| 4-allyloxy-3-chlorophenylacetic acid (Mervan) | 393.75 | 3.937 |
| Monoethanol amine | 106.25 | 1.062 |
| Xylocaine hydrochloride | 30 | 0.300 |
| Benzyl alcohol | 45 | 0.450 |
| Sodium metabisulfite | 3 | 0.030 |
| Water for injection ad | [1] 3 | [2] 30 |

[1] Milliliter.
[2] Liter.

In a 50 l. balloon flask equipped with a stirrer, the monoethanolamine, benzyl alcohol and sodium metasulfite were dissolved in 20 l. water for injection (oxygen free) while nitrogen was continuously bubbled through the solution. The Mervan was dissolved in this solution while stirring was effected. After the Mervan entirely dissolved xylocaine was dissolved thereinto. The resultant solution was diluted with water for injection (oxygen free) to volume.

The solution was then filtered through a 0.22 microns millipore filter under nitrogen pressure and sterilized brown ampoules were filled therewith under nitrogen protection.

Mervan suppositories:
    Formula: Witepsol H15 (lauric acid, 1400 mg., glyceric ester used as base for suppositories); Mervan, 600 mg.

Method of manufacture:
    Melt the Witepsol H15, add the Mervan and mix using an "ultra Turax" type mixer. Pour into mold.

As an example of use of ethanolamine salt of 3-chloro-4-allyloxyphenylacetic acid as liquid for injection, the composition is as follows:

| | G./ml. |
|---|---|
| Salt | 0.166 |
| Xylocaine | 0.010 |
| Benzyl alcohol | 0.015 |

We claim:
1. 3-chloro-4-allyloxyphenylacetic acid.

References Cited

UNITED STATES PATENTS

| 3,385,886 | 5/1968 | Nicholson et al. | 280—521 R |
| 3,586,713 | 6/1971 | Boo-Hoi et al. | 260—473 R |

FOREIGN PATENTS

| 901,614 | 8/1945 | France. |

OTHER REFERENCES

Boo-Hoi et al.: C. A., 67, 32435v (1967).
Brewster et al.: "Organic Chemistry," Prentice-Hall Inc., N.O. (1961), pp. 212 and 247.

LORRAINE A. WEINBERGER, Primary Examiner

J. F. TERAPANE, Assistant Examiner

U.S. Cl. X.R.

260—285, 520; 424—260, 316, 317

UNITED STATES PATENT OFFICE
CERTIFICATE OF CORRECTION

Patent No. 3,824,277           Dated July 16, 1974

Inventor(s) NGUYEN PHUC BUU-HOI et al

It is certified that error appears in the above-identified patent and that said Letters Patent are hereby corrected as shown below:

Column 1, line 11, change "1974" to --1967--.

Column 26, line 4, change "Boo" to --Buu--.

Column 26, line 10, change "Boo" to --Buu--.

Signed and sealed this 19th day of November 1974.

(SEAL)
Attest:

McCOY M. GIBSON JR.         C. MARSHALL DANN
Attesting Officer             Commissioner of Patents